US008840856B2

(12) United States Patent
Morinaka et al.

(10) Patent No.: US 8,840,856 B2
(45) **Date of Patent: *Sep. 23, 2014**

(54) METHOD FOR PRODUCING IMIDIC ACID SALT

(75) Inventors: Takayoshi Morinaka, Ube (JP); Tsutomu Nanmyo, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 181 days.

This patent is subject to a terminal disclaimer.

(21) Appl. No.: 13/322,782

(22) PCT Filed: Jun. 1, 2010

(86) PCT No.: PCT/JP2010/059255

§ 371 (c)(1),
(2), (4) Date: Nov. 28, 2011

(87) PCT Pub. No.: WO2010/140580

PCT Pub. Date: Dec. 9, 2010

(65) Prior Publication Data

US 2012/0070358 A1 Mar. 22, 2012

(30) Foreign Application Priority Data

Jun. 3, 2009 (JP) ................................ 2009-133596

(51) Int. Cl.

| | |
|---|---|
| ***C01B 25/10*** | (2006.01) |
| ***C01B 21/097*** | (2006.01) |
| ***C01B 21/093*** | (2006.01) |
| ***C01B 21/086*** | (2006.01) |
| *B01J 31/02* | (2006.01) |

(52) U.S. Cl.

CPC ............ *C01B 21/086* (2013.01); *B01J 31/0245* (2013.01); *C01B 21/0975* (2013.01); *B01J 31/0252* (2013.01); *C01B 21/093* (2013.01)

USPC .......................................... 423/300; 423/301

(58) Field of Classification Search

USPC ................................. 423/300, 301, 386, 413

See application file for complete search history.

(56) References Cited

U.S. PATENT DOCUMENTS

| | | | | |
|---|---|---|---|---|
| 3,379,509 | A | 4/1968 | Appel | |
| 4,315,935 | A | 2/1982 | Ali | |
| 7,465,834 | B2 * | 12/2008 | Sueto et al. | 564/463 |
| 8,580,220 | B2 * | 11/2013 | Honda et al. | 423/386 |
| 2001/0021790 | A1 | 9/2001 | Yonezawa et al. | |
| 2002/0055045 | A1 * | 5/2002 | Michot et al. | 429/307 |
| 2004/0097757 | A1 | 5/2004 | Cernik et al. | |
| 2007/0043231 | A1 | 2/2007 | Hammami et al. | |

FOREIGN PATENT DOCUMENTS

| | | | |
|---|---|---|---|
| JP | 2004-522681 | A | 7/2004 |
| JP | 3623452 | B2 | 12/2004 |
| JP | 2007-182410 | A | 7/2007 |
| WO | WO 2007/022624 | A1 | 3/2007 |
| WO | WO 2010/010613 | A1 | 1/2010 |

OTHER PUBLICATIONS

International Search Report with partial English translation dated Aug. 10, 2010 (five (5) sheets).

Form PCT/ISA/237 (three (3) sheets).

Krumm et al.,"Synthesis of Poly- and the First Perfluoroalkyl-N(SO2F)2 Derivatives: Improved Methods for the Preparation of XN(SO2F)2 (X=H,Cl) and Single-Crystal Diffraction Studies of HN(SO2CL)2, HN(SO2F)2, and CF3CH2N(SO2F)2", Inorganic Chemistry, 1998, pp. 6295-6303, vol. 37 (nine (9) sheets).

Ruff et al.,"Imidodisulfuryl Fluoride, Cesium Imidodisulfuryl Fluoride, and Fluoroimidodisulfuryl Fluoride", Inorganic Syntheses, 1968, pp. 138-143, vol. 11 (three (3) sheets).

Xu et al., "A New Protonation Chemistry of Phosphazenes and the Formation of Bis (sulfonyl) Imides", Inorganic Chemistry Communications, 1999, pp. 261-261, vol. 2 (four (4) sheets).

Fluck et al.,"Bis(difluorphosphoryl)Amin und Einige N-Derivate", Z. Anorg. Allg. Chem., 1975, pp. 65-70, vol. 412 (six (6) sheets).

Degering et al., "A Potential Industrial Process for Sulfamide", Industrial and Engineering Chemistry, 1943, pp. 751-753 (three (3) sheets).

Traube et al., "Zur Kenntnis des Sulfamids", Ber. 1923, pp. 1656-1663, vol. 56 (four (4) sheets).

Extended European Search Report dated May 6, 2014 (7 pages).

Beran et al., "A New Method of the Preparation of Imido-bis(sulfuric acid) Dihalogenide, (F,Cl), and the Potassium Salt of Imido-bis-(sulfuric acid) Difluoride," Zeitschrift F� R Anorganische und Allgemeine Chemie, 2005, vol. 631, No. 1, XP055014688 (pp. 55-59).

* cited by examiner

*Primary Examiner* — Wayne Langel

(74) *Attorney, Agent, or Firm* — Crowell & Moring LLP

(57) ABSTRACT

To provide an imide salt represented by the formula $$[(R)_2N]M$$

wherein, R represents a halosulfonyl group ($-SO_2X^1$ where $X^1$ is a halogen such as fluorine, chlorine, bromine and iodine) or dihalophosphoryl group ($-POX^2X^3$ where $X^2$ and $X^3$ are the same or different halogens such as fluorine, chlorine, bromine and iodine), and M represents an alkali metal;

with high selectivity and high efficiency by using a low-cost starting material.

In the production of an imide salt, an alkali metal fluoride, a sulfuryl halide or phosphoryl halide, and ammonia or an ammonium salt are reacted. According to this method, a desired imide salt can be produced with high yield, while greatly suppressing the production of a by-product.

4 Claims, No Drawings

METHOD FOR PRODUCING IMIDIC ACID SALT

TECHNICAL FIELD

The present invention relates to a method for producing an imide compound useful as an intermediate for medicines and agrichemicals, a battery electrolyte and an acid catalyst, and more specifically to a method for producing bis(halogenated sulfonyl)imide salt or a bis(dihalogenated phosphoryl)imide compound.

BACKGROUND OF INVENTION

Bis(halogenated sulfonyl)imide or a bis(dihalogenated phosphoryl) imide compound, which has hitherto been known widely, is a substance useful as a solvent for battery electrolytes, an acid catalyst or an ionic liquid, and also as an antistatic agent. As a method for producing a bis(fluorosulfonyl)imide compound, there has been known a production method of Patent Document 1 in which fluorosulfonic acid is reacted with urea thereby obtaining bis(fluorosulfonyl)imide and a production method of Non-Patent Publications 1 and 2 in which bis(chlorosulfonyl)imide is reacted with a metal fluoride or the like thereby obtaining bis(fluorosulfonyl)imide.

As a method for producing a bis(chlorosulfonyl)imide compound, there has been known a method of Patent Document 2 in which chlorosulfonic acid ($ClSO_3H$) is reacted with chlorosulfonylisocyanate ($ClSO_2NCO$) thereby obtaining bis(chlorosulfonyl)imide and a method of Non-Patent Document 3 in which chlorosulfonic acid ($ClSO_3H$) is reacted with N-chlorosulfonyl trichlorophosphazene ($ClSO_2NPCl_3$) thereby obtaining bis(chlorosulfonyl)imide.

Relating to a method of producing a bis(difluorophosphoryl)imide compound, there has been known a method of Non-Patent Document 4 in which $LiN(SiMe_3)_2$, a silazane metal compound, is reacted with phosphoryl trifluoride ($POF_3$) thereby obtaining lithium bis(difluorophosphoryl)imide.

As an example of using halogenated sulfuryl used in the invention of the present application, there is disclosed a production method of Non-Patent Documents 5 and 6 where sulfuryl chloride or sulfuryl fluoride is reacted with anhydrous ammonia thereby obtaining sulfamide ($H_2NSO_2NH_2$), and a production method of Patent Document 3 where a tertiary amine such as a silazane derivative is reacted with halogenated sulfuryl thereby obtaining a bis(halogenated sulfonyl)imide derivative.

On the other hand, a production method of reacting halogenated sulfuryl or halogenated phosphoryl with ammonia in the presence of an alkali metal fluoride thereby obtaining bis(halogenated sulfonyl)imide or a bis(halogenated phosphoryl)imide compound as the invention of the present application is not known.

REFERENCES ABOUT PRIOR ART

Patent Publication

Patent Publication 1: U.S. Pat. No. 3,379,509
Patent Publication 2: U.S. Pat. No. 4,315,935
Patent Publication 3: International Application Publication 2007/022624

Non-Patent Publication

Non-Patent Publication 1: Inorganic Chemistry, 37 (24), pages 6295-6303 (1998)
Non-Patent Publication 2: Inorganic Synthesis, 11, pages 138-143 (1968)
Non-Patent Publication 3: Inorganic Chemistry Communications, 2 (6), pages 261-264 (1999)
Non-Patent Publication 4: Z. Anorg. Allg. Chem. 412 (1), pages 65-70 (1975)
Non-Patent Publication 5: Ind. Eng. Chem. pages 751-753 (1943)
Non-Patent Publication 6: Ber., 56, B, 1656 (1923)

SUMMARY OF INVENTION

The method of Patent Publication 1 is hard to adopt as an industrial production method, from the fact that fluorosulfonic acid which is highly toxic and corrosive is used therein and that bis(fluorosulfonyl)imide and fluorosulfonic acid obtained through this reaction are so difficult to separate as to lower the yield. Additionally, in the methods of Non-Patent Publications 1 and 2, highly toxic and costly arsenic trifluoride and antimony trifluoride are used, so that it is disadvantageous to apply these methods to an industrial mass production.

Furthermore, the methods of Patent Publication 2 and Non-Patent Publication 3 have a disadvantage of using relatively costly chlorosulfonylisocyanate ($ClSO_2NCO$) or N-chlorosulfonyl trichlorophosphazene ($ClSO_2NPCl_3$). The methods of Patent Publication 3 and Non-Patent Publication 4 use a costly silazane derivative as a nitrogen source and therefore not said to be an inexpensive method.

Thus, the conventionally known methods for producing a bis(fluorosulfonyl)imide compound which is useful as an intermediate for medicines and agrichemicals, a battery electrolyte or an acid catalyst are not sufficiently satisfactory as a large-scale production method, though suitable for obtaining a target substance on a small scale.

Means for Solving Problems

In view of the above problems, the present inventors had eagerly made studies thereon. As a result, the inventors have found it possible to produce an imide salt represented by formula [1]

$$[(R)_2\text{—N}]\,M \qquad [1]$$

[In the formula [1], R represents a halosulfonyl group (—$SO_2X^1$ where $X^1$ is a halogen such as fluorine, chlorine, bromine and iodine) or dihalophosphoryl group (—$POX^2X^3$ where $X^2$ and $X^3$ are the same or different halogens such as fluorine, chlorine, bromine and iodine), and M represents an alkali metal.]

with high selectivity and high yield by reacting: an alkali metal fluoride; a sulfuryl halide ($SO_2X^4X^5$ where $X^4$ and $X^5$ represent the same or different halogens such as fluorine, chlorine, bromine and iodine, and are the same as or different from the above-mentioned $X^1$) or phosphoryl halide ($P(=O)X^6X^7X^8$ where $X^6$, $X^7$ and $X^8$ represent the same or different halogens such as fluorine, chlorine, bromine and iodine, and are the same as or different from the above-mentioned $X^2$ or $X^3$); and ammonia or an ammonium salt, in a method for producing the imide salt represented by the formula [1], thereby attaining the present invention.

More specifically, inventions as discussed in the following [Invention 1] to [Invention 5] are provided.

[Invention 1]

A method for producing an imide salt represented by formula [1], comprising the step of:

reacting an alkali metal fluoride, a sulfuryl halide or phosphoryl halide, and ammonia or an ammonium salt.

[Invention 2]

A method as discussed in Invention 1, wherein the alkali metal fluoride and the sulfuryl halide or phosphoryl halide are made coexistent in the reaction system firstly, followed by bringing ammonia or the ammonium salt into the reaction.

[Invention 3]

A method as discussed in Invention 1, wherein the alkali metal fluoride is a compound represented by formula [2].

MF [2]

[In the formula [2], M represents any one alkali metal of Li, Na, K and Cs.]

[Invention 4]

A method as discussed in Invention 1, wherein the sulfuryl halide or phosphoryl halide is used in an amount of 1 to 10 moles relative to 1 mole of ammonia or the ammonium salt.

[Invention 5]

A method as discussed in any one of Inventions 1, wherein the reaction temperature at the time of reacting the alkali metal fluoride, the sulfuryl halide or phosphoryl halide, and ammonia or the ammonium salt is −50 to 150° C.

The invention of the present application is characterized by reacting an alkali metal fluoride, a sulfuryl halide or phosphoryl halide, and ammonia or an ammonium salt. For example, as discussed in Non-Patent Publications 5 and 6, it is traditionally known that a compound referred to as "sulfamide" is formed when a sulfuryl halide is reacted with anhydrous ammonia. Moreover, these publications disclose also that many other by-products are formed in addition to sulfamide (see Scheme 1).

<SCHEME 1>

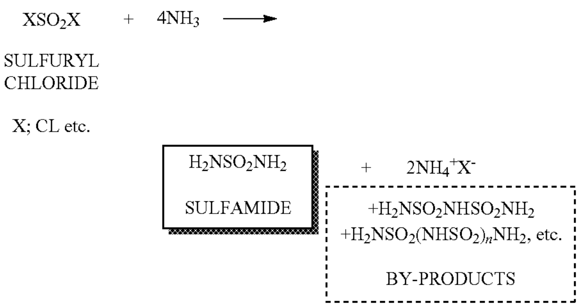

On the other hand, Patent Publication 3 discloses that a sulfuryl halide is reacted with amine such as a silazane derivative thereby producing a corresponding imide compound; however, if the method of Patent Publication 3 is applied to the invention of the present application in the use of, for example sulfuryl fluoride ($SO_2F_2$), it has been found that the target substance "bisfluorosulfonylimide salt" is hardly obtained and by-products including sulfamide are greatly formed (see the following Scheme 2).

<SCHEME 2>

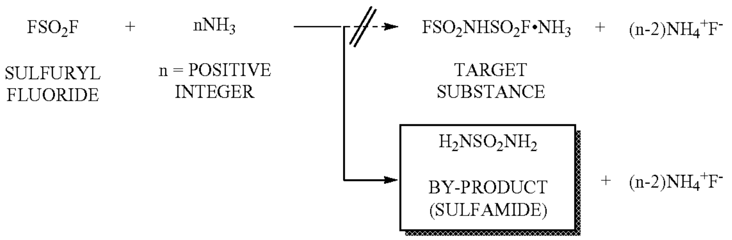

In view of the above, the present inventors have found it possible to obtain an imide salt at a high conversion rate and a high selectivity by adding an alkali metal fluoride to the reaction system (see the following Scheme 3).

<SCHEME 3>

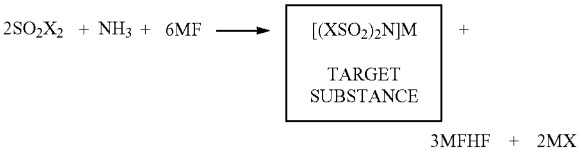

Sulfuryl fluoride ($SO_2F_2$) used according to the present invention has two moieties reactive with ammonia (i.e., two fluorine atoms). However, in the present invention, a compound to which the two reactive moieties are bonded is hardly obtained except for the target substance obtained in Scheme 3. Thus it has been found also that the target substance is formed by priority.

Moreover, the present inventors found a preferable condition for carrying out the invention of the present application in regard to a method of introducing a reagent into the reaction system. By employing an operation modifying the order of the addition to the reaction system (i.e., a method of adding an alkali metal fluoride and a sulfuryl halide to the reaction system firstly, followed by bringing ammonia or an ammonium salt into the reaction system), they attained an extremely useful finding that the target substance is obtained at a high selectivity and a high yield.

Thus, the present invention suitably employs a preferable reaction condition in the production of an imide salt, thereby allowing an industrially easy production as compared with conventional techniques.

Effects of Invention

The present invention employs a sulfuryl halide or phosphoryl halide, which is not only inexpensive but also favorable to handling in large quantity. With this, there is provided the effect of producing a target imide salt at high yield while suppressing the formation of by-products under a moderate reaction condition.

Mode for Carrying out Invention

Hereinafter, the present invention will be discussed in detail. The present invention is a method for producing an imide salt represented by formula [1], comprising the step of reacting an alkali metal fluoride, a sulfuryl halide or phosphoryl halide, and ammonia or an ammonium salt.

The sulfuryl halide used in the present invention is exemplified by sulfuryl fluoride, sulfuryl chloride, sulfuryl bromide and sulfuryl iodide, and the phosphoryl halide is exemplified by phosphoryl fluoride, phosphoryl chloride, phosphoryl bromide and phosphoryl iodide. Among these, the particularly preferable are sulfuryl fluoride, sulfuryl chloride, phosphoryl fluoride and phosphoryl chloride.

The amount of the sulfuryl halide or phosphoryl halide is usually 1 to 10 moles, preferably 1 to 8 moles and more preferably 1 to 5 moles relative to 1 mole of ammonia.

The alkali metal fluoride used in the present invention is exemplified by lithium fluoride, sodium fluoride, potassium fluoride and cesium fluoride. Of these, potassium fluoride and cesium fluoride are particularly preferable.

The amount of the alkali metal fluoride to be used is stoichiometrically 6 moles relative to 1mole of ammonia, while being 3 moles relative to 1 mole of the sulfuryl halide or phosphoryl halide. However, it is preferable to use the alkali metal fluoride in larger amount than stoichiometric ones in order to develop the reaction smoothly, as shown in the above schemes.

Accordingly, the amount of the alkali metal fluoride to be used is 1 to 20 moles (preferably 3 to 10 moles) relative to 1 mole of ammonia, while being 1 to 10 moles (preferably 3 to 6 moles) relative to 1 mole of the sulfuryl or phosphoryl.

Besides, the reaction in itself can proceed even in a case where the alkali metal fluoride is less than 3 moles relative to 1 mole of the sulfuryl or phosphoryl. In this case, however, the conversion rate is sometimes reduced and therefore it is preferable to perform the reaction in the above-mentioned equivalent amount.

Additionally, the present invention allows the reaction to proceed in the coexistence with water or an organic solvent, though it can be accomplished even with no solvent. The organic solvent means an inert organic compound which does not directly relate to the reaction of the present invention. The reaction solvent is exemplified by: aliphatic hydrocarbons such as n-hexane, cyclohexane and n-heptane; aromatic hydrocarbons such as benzene, toluene, xylene and mesitylene; halogenated hydrocarbons such as methylene chloride, chloroform and 1,2-dichloroethane; ethers such as diethyl ether, tetrahydrofuran and tert-butyl methyl ether; esters such as ethyl acetate and butyl acetate; amides such as N,N-dimethylformamide, N,N-dimethylacetamide and N-methylpyrrolidone; nitriles such as acetonitrile and propionitrile; dimethylsulfoxide; and the like.

Among these, the preferable are esters such as ethyl acetate and butyl acetate, amides such as N,N-dimethylformamide, N,N-dimethylacetamide and N-methylpyrrolidone, nitriles such as acetonitrile and propionitrile, and dimethylsulfoxide. The further preferable are nitriles such as acetonitrile and propionitrile. These reaction solvents may be used singly or in combination.

The amount of the solvent is not particularly limited but it is required only to use it in an amount of not smaller than 0.1 L (liter), usually preferably 0.1 to 20 L, and particularly preferably 0.1 to 10 L.

The temperature condition is not particularly limited and is required only to be within a range of from −50 to 150° C. It is usually preferably 0 to 100° C. and particularly preferably 0 to 70° C. Temperatures lower than −50° C. reduce the reaction rate, while those exceeding 150° C. sometimes cause the decomposition of products and the like.

The pressure condition is not particularly limited and therefore it is possible to conduct the reaction under the condition of atmospheric pressure (0.1 MPa (an absolute pressure which will be adhered to hereinafter)) or under a depressurized or pressurized condition provided in the use of a pressure-resistant reactor. More specifically, the reaction is required only to be conducted within a range of from 0.01 to 2 MPa. In this case, a pressure of 0.01 to 1.5 MPa is preferable, and particularly 0.1 to 1 MPa is more preferable.

A reactor to be used in the reaction is exemplified by Monel, Hastelloy, nickel, and pressure-resistant reactors subjected to lining with these metals or fluorocarbon polymers such as polytetrafluoroethylene and perfluoropolyether resin.

The reaction time is not particularly limited and required only to be within a range of from about 0.1 to 120 hours. The reaction time differs according to the substrate and the reaction conditions, so that it is preferable to pursue the progress of the reaction by using an analytical means such as nuclear magnetic resonance (NMR) thereby determining a temporal point at which the raw material has almost been consumed off as the endpoint of the reaction.

Hereinafter, "preferable conditions" in the present invention will be discussed.

An imide salt represented by formula [1] can be produced by reacting an alkali metal fluoride, a sulfuryl halide or phosphoryl halide, and ammonia or an ammonium salt. Concerning the order in which materials are charged into the reactor, it is preferable, for example, to firstly charge a pressure-resistant reactor such as an autoclave with a solvent, the alkali metal fluoride and the sulfuryl halide or phosphoryl halide and then ammonia, followed by initiating a reaction with the reactor closed tightly.

At the time of the reaction, it is preferable that sulfuryl halide or phosphoryl halide is in an amount of 2 to 5 moles and an alkali metal fluoride is in an amount of 6 to 10 moles, relative to 1 mole of ammonia.

Furthermore, the amount of the solvent to be used is preferably 0.1 to 20 L relative to 1 mole of ammonia. The temperature condition is preferably −50 to 150° C. Moreover, the pressure condition is preferably 0.1 to 1.5 MPa.

By conducting the reaction under such conditions, it becomes possible to obtain an imide salt at a high selectivity and a high yield.

EXAMPLES

The present invention will be more specifically discussed with reference to the following Examples; however, the present invention is not limited by these Examples. In the following description, "%" used for compositional analysis means "area %" of the composition obtained by analyzing a reaction mixture by nuclear magnetic resonance (NMR).

Example 1

A 1 L autoclave was charged with 600 g of acetonitrile and 143 g (2.46 mol) of potassium fluoride and then cooled to 5°

C. with ice water, followed by introducing 133 g (1.30 mol) of sulfuryl fluoride. Subsequently, 10 g (0.59 mol) of anhydrous ammonia was introduced over one hour. The reactor was increased in temperature to 60° C., upon which the reaction was brought into termination. A reaction liquid was filtered and a solvent was distilled out thereof, thereby obtaining 113 g of a crude bisfluorosulfonylimide potassium salt. The crude compound was recrystallized with ethanol thereby obtaining 90.5 g of potassium bisfluorosulfonylimide having a purity of 99% or more. The yield was 70%.

Example 2

A 1 L autoclave was charged with 500 g of acetonitrile and 74.7 g (492 mmol) of cesium fluoride and then cooled to 5° C. with ice water, followed by introducing 26.6 g (260 mmol) of sulfuryl fluoride. Subsequently, 2.0 g (120 mmol) of anhydrous ammonia was introduced over one hour. The reactor was increased in temperature to 60° C., upon which the reaction was brought into termination. A reaction liquid was filtered and a solvent was distilled out thereof, thereby obtaining 36.5 g of a crude bisfluorosulfonylimide cesium salt. The crude compound was recrystallized with ethanol thereby obtaining 24.4 g of bisfluorosulfonylimide cesium salt having a purity of 99% or more. The yield was 65%.

Example 3

A 1 L autoclave was charged with 650 g of acetonitrile and 209 g (3.60 mol) of potassium fluoride and then cooled to 5° C. with ice water, followed by introducing 155 g (1.56 mol) of phosphoryl trifluoride. Subsequently, 10.4 g (0.61 mol) of anhydrous ammonia was introduced over one hour. The reactor was increased to room temperature, upon which the reaction was brought into termination. The production ratio of this reaction was such that production of bis(difluorophosphoryl) imide was 100%, while production of $F_2P(=O)NPF(=O)NP(=O)F_2$ was not confirmed.

Example 4

A 1 L autoclave was charged with 400 g of acetonitrile and 71.0 g (1.23 mol) of potassium fluoride and then cooled to 5° C. with ice water, followed by introducing 57.4 g (0.374 mol) of phosphoryl trichloride. Subsequently, 3.0 g (0.176 mol) of anhydrous ammonia was introduced over one hour. The reactor was increased to room temperature, upon which the reaction was brought into termination. The production ratio of this reaction was such that production of bis(dichlorophosphoryl) imide was 98%, while 2% of an intermediate, i.e., chlorophosphorylamide, remained.

Comparative Example 1

A 200 mL autoclave was charged with 50 g of acetonitrile and then cooled to 5° C. with ice water, followed by introducing 23.3 g (228 mmol) of sulfuryl fluoride. Subsequently, 12.4 g (729 mmol) of anhydrous ammonia was introduced. The reactor was increased to room temperature, followed by stirring for 48 hours. This reaction liquid was filtered and a solvent was distilled out thereof, thereby obtaining 10.1 g of a white-colored solid. However, it was confirmed that the white-colored solid contained sulfamide as the primary component. Furthermore, the white-colored solid contained 0.3 wt % of bisfluorosulfonylimide. (The yield was 0.1%).

The invention claimed is:

1. A method for producing an imide salt represented by formula [1]

$$[(R)_2N]M \quad [1]$$

wherein, R represents a halosulfonyl group ($—SO_2X^1$ where $X^1$ is a halogen selected form the group consisting of fluorine, chlorine, bromine and iodine) or dihalophosphoryl group ($—POX^2X^3$ where $X^2$ and $X^3$ are the same or different halogens selected form the group consisting of fluorine, chlorine, bromine and iodine), and M represents an alkali metal, comprising the step of:

reacting an alkali metal fluoride, a sulfuryl dihalide ($SO_2X^4X^5$ where $X^4$ and $X^5$ represent the same or different halogens selected form the group consisting of fluorine, chlorine, bromine and iodine, and are the same as or different from the above-mentioned $X^1$) or phosphoryl halide ($P(=O)X^6X^7X^8$ where $X^6$, $X^7$ and $X^8$ represent the same or different halogens selected form the group consisting of fluorine, chlorine, bromine and iodine, and are the same as or different from the above-mentioned $X^2$ or $X^3$), and ammonia or an ammonium salt, wherein the alkali metal fluoride and the sulfuryl dihalide or phosphoryl halide are made coexistent in the reaction system firstly, followed by bringing ammonia or the ammonium salt into the reaction.

2. A method as claimed in claim 1, wherein the alkali metal fluoride is a compound represented by formula [2]

$$MF \quad [2]$$

wherein, M represents any one alkali metal of Li, Na, K and Cs.

3. A method as claimed in claim 1, wherein the sulfuryl halide or phosphoryl halide is used in an amount of 1 to 10 moles relative to 1 mole of ammonia or the ammonium salt.

4. A method as claimed in claim 1, wherein the reaction temperature at the time of reacting the alkali metal fluoride, the sulfuryl halide or phosphoryl halide, and ammonia or the ammonium salt is −50 to 150° C.

* * * * *